Feb. 27, 1923.

G. F. MESSER.
SIGNAL.
FILED AUG. 6, 1920.

WITNESSES

INVENTOR
G. F. Messer,
BY
ATTORNEYS

Feb. 27, 1923.
G. F. MESSER.
SIGNAL.
FILED AUG. 6, 1920.
1,447,098.
4 SHEETS—SHEET 2.
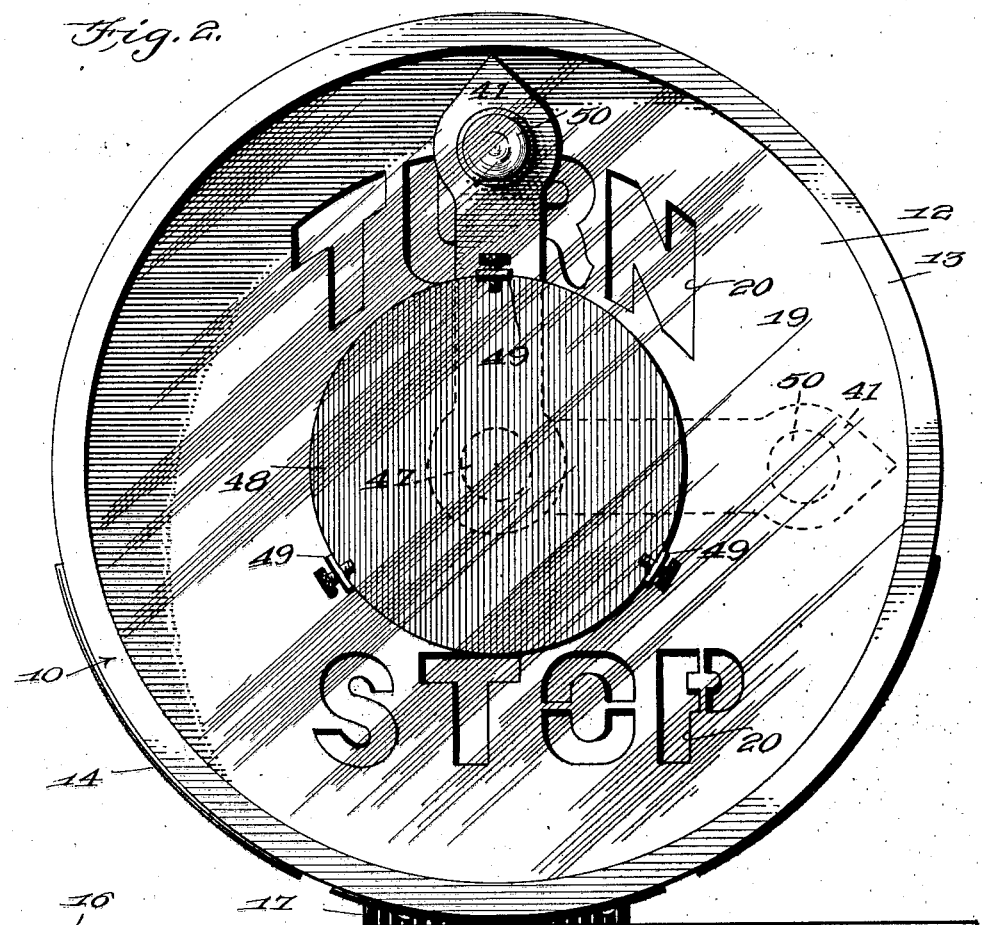
Fig. 2.
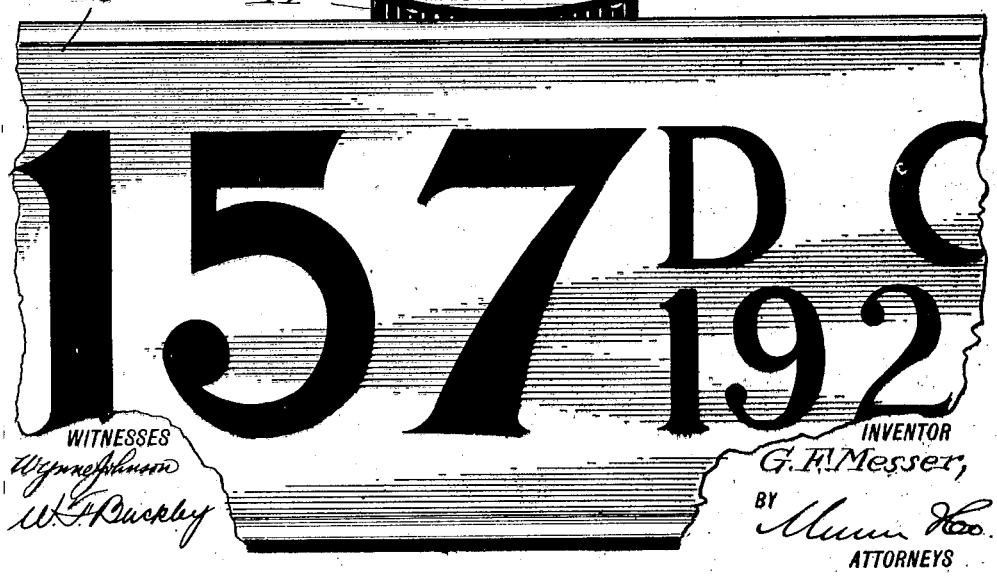
WITNESSES
INVENTOR
G. F. Messer,
BY
ATTORNEYS

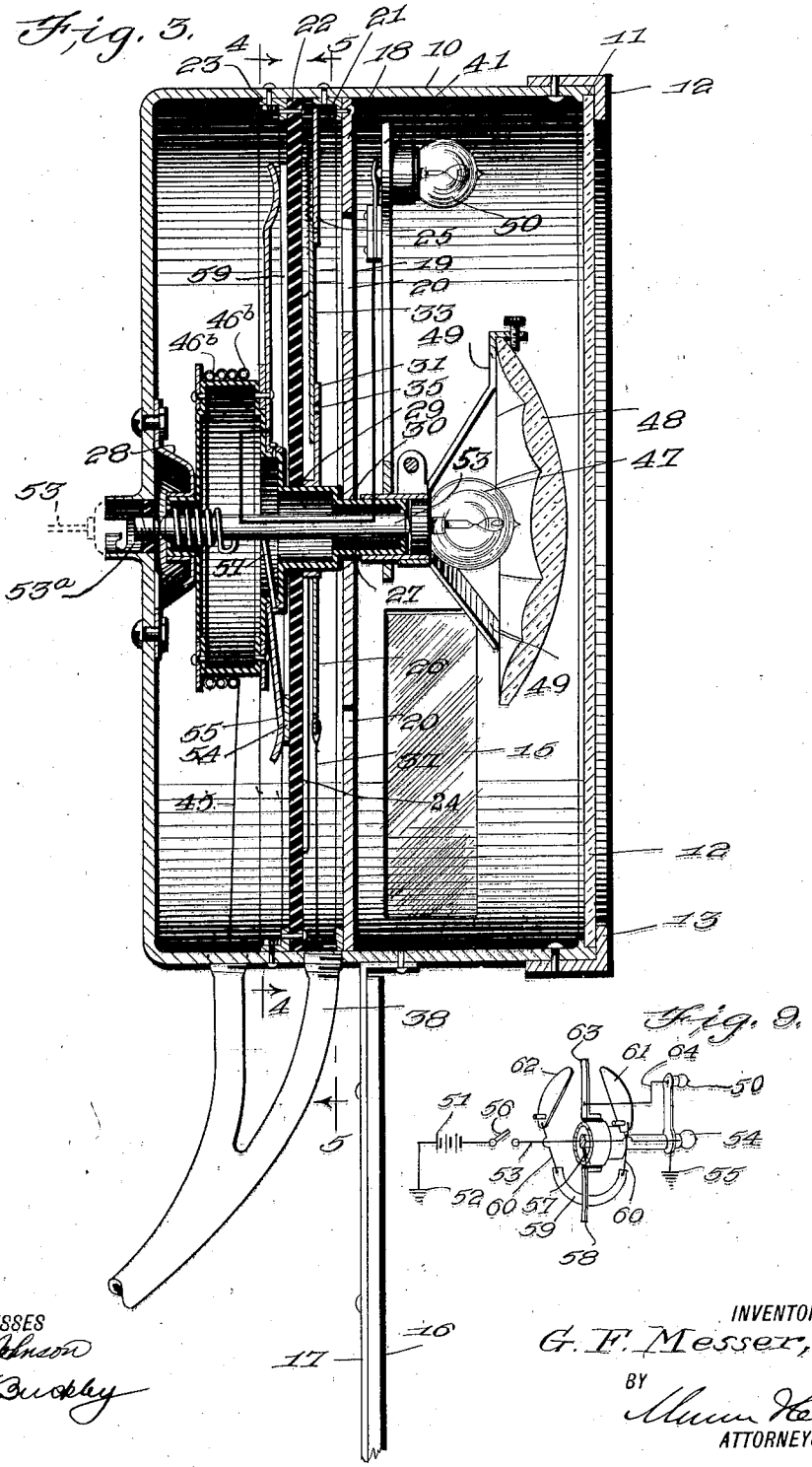

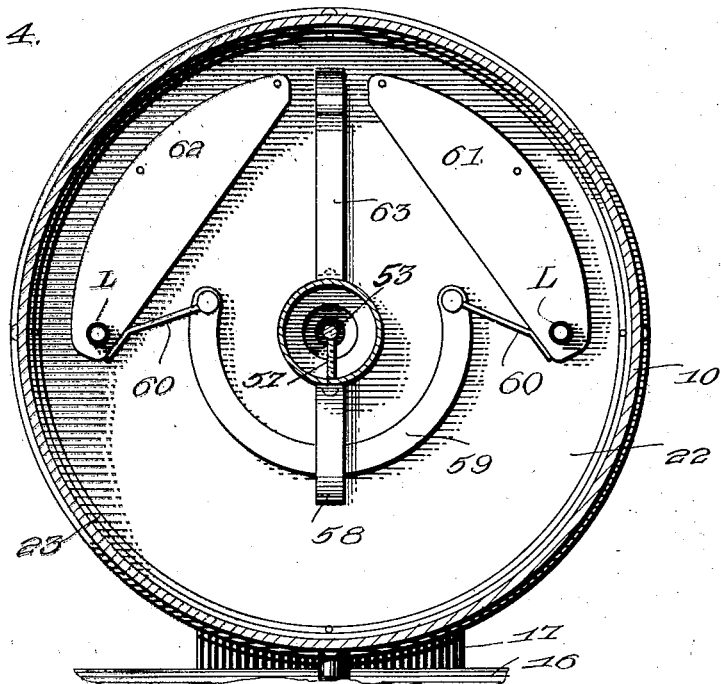
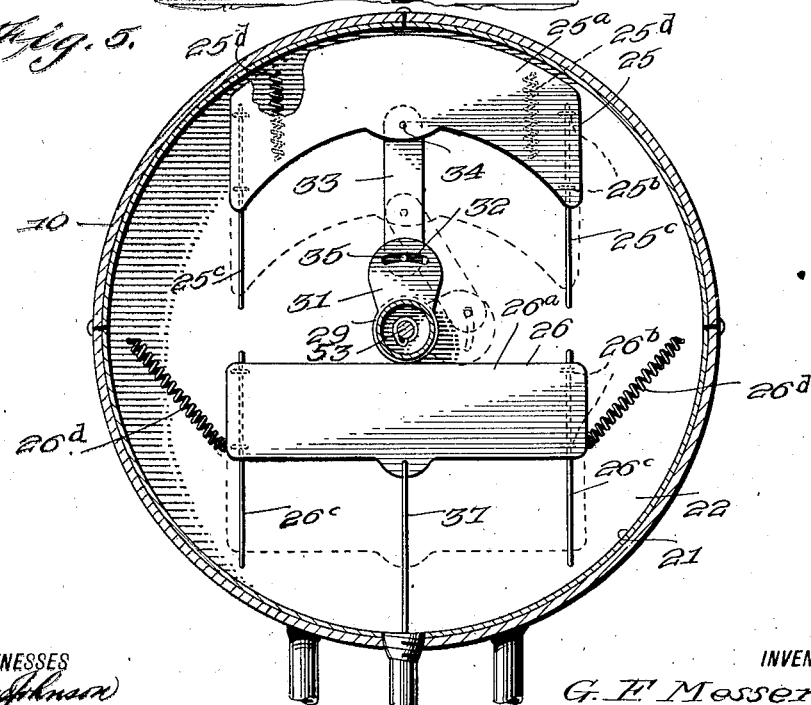

Patented Feb. 27, 1923.

1,447,098

UNITED STATES PATENT OFFICE.

GEORGE FREDERICK MESSER, OF ABERDEEN, WASHINGTON.

SIGNAL.

Application filed August 6, 1920. Serial No. 401,722.

*To all whom it may concern:*

Be it known that I, GEORGE FREDERICK MESSER, a citizen of the United States, and a resident of Aberdeen, in the county of Grays Harbor and State of Washington, have invented certain new and useful Improvements in Signals, of which the following is a specification.

The present invention relates in general to signals, and more particularly to an improved vehicle signal especially adapted for use with automobiles or the like.

The object of the invention is to provide an improved signal of this character which is adapted to be mounted upon the automobile or the like and which when so mounted will serve to transmit intelligence to the operators of adjacent vehicles or to other persons interested concerning changes in the direction or rate of motion of the automobile which have been initiated or about to be initiated.

Another object of the invention is to provide a signal of this character which is automatic in its operation and does not detract the attention of the automobile driver from his duties as operator of the car.

Another object is to provide a signal of this character which is effective and efficient in the night as well as in the day and which is of simple and durable construction reliable in operation, attractive in appearance, and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 2 is an elevational view of the signal proper;

Figure 3 is a transverse vertical sectional view thereof;

Figure 4 is a transverse sectional view on line 4—4 of Figure 3;

Figure 5 is a transverse section on line 5—5 of Figure 3;

Figure 6 is a sectional view on line 6—6 of Figure 1;

Figure 7 is a detail perspective view of one of the sections comprising the reel;

Figure 8 is a detail view of the extensible elements mounted upon the spool; and Figure 9 is a diagrammatic view of the circuits.

Figure 1:
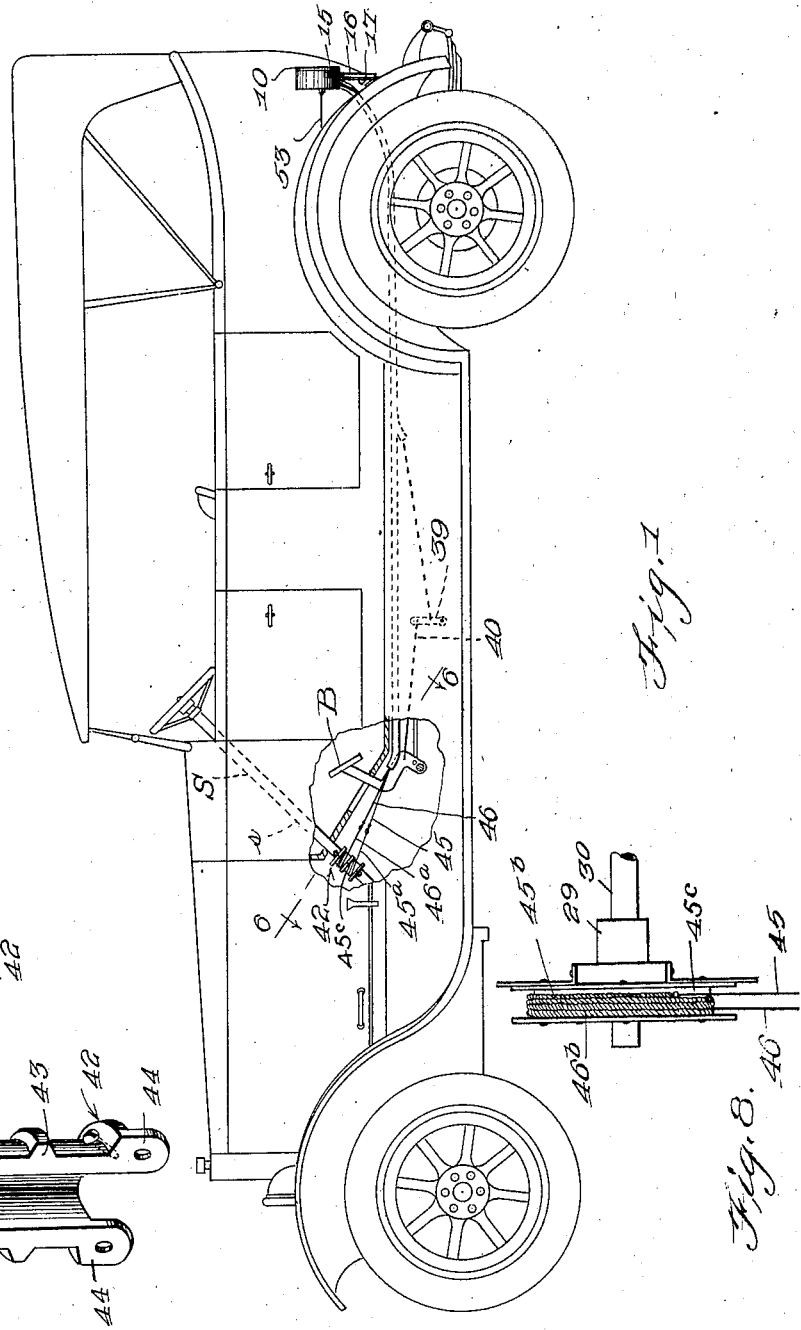
Figure 1 is a side elevational view of the invention mounted on an automobile.

Referring to the drawings it will be seen that the invention is adapted to be mounted upon a vehicle such as an automobile and preferably is mounted upon the rear of the vehicle.

The signal comprises a cylindrical casing 10 having an open front 11 covered by a clear glass plate 12 which is held in place by a retaining ring 13. The walls of the cylindrical casing are provided with two light openings covered by a clear isinglass 15. The light openings 15 serve to illuminate the license plate 16 as will be hereinafter more fully described. Both the cylindrical casing 10 and the license plate 16 are mounted upon the rear mud guard or other suitable means by means of a bracket 17.

A signalling plate 18 is arranged within the casing and preferably is constructed of sheet metal and has its face 19 which is visible through the glass 12 painted white. The signalling plate bears suitable signalling indicia 20 which is cut out from the plate and preferably consists of the words "Turn" and "Stop" arranged at the upper and lower portions of the plate, as clearly shown in Figure 2. Suitable fastening means 21 serve to secure the signalling plate 18 in position in the casing. A circular plate 22 of fiber is secured, as at 23, to the inner wall of the casing at a suitable distance to the rear of the signalling plate 18. The face 24 of the plate 22 adjacent the signalling plate is painted white so that when the plate 22 constitutes the background for the signalling plate as it normally does it camouflages the signalling indicia as there is no contrast afforded as between the white outline words "Turn" and "Stop" and the white background therefor.

A movable curtain 25 is provided for the word "Turn" of the signalling indicia and a movable curtain 26 is provided for the word "Stop." As clearly shown in Figure 3, these curtains are arranged between the plates 18 and 22. The faces 25ª and 26ª of the plates 25 and 26 are painted black so as to be in direct contrast with the white outlined letters of the signalling indicia. The curtains 25 and 26 are normally disposed above and out of alinement with the words "Turn" and "Stop," respectively, and for this purpose the plates are each provided with guides 25ᵇ and 26ᵇ, respectively, which respectively engage guide rods 25ᶜ and 26ᶜ to thereby constrain the curtains to vertical movement. The plates are influenced to and normally maintained in the highest position on the guide rods and out of alinement with the indicia by means of retractile coil springs 25ᵈ and 26ᵈ, respectively.

Means are provided for automatically and independently moving either the curtain 25 or the curtain 26 to behind its associated signalling indicia so as to afford the contrast necessary to clearly delineate the words comprising the indicia.

The means for moving the curtain 25 comprises a rotary spindle 27 of metallic construction suitably journaled in the casing 10 by means of a bearing 28 secured to the rear wall of the casing and bearings 29 and 30 formed in the plates 22 and 18. The rotatable spindle carries a radial arm 31 provided with an arcuate slot 32. A link 33, has one end pivoted, as at 34, to the curtain 25 and carries a pin 35 at its opposite end which is slidably arranged in the arcuate slot 32 of the radial arm 31. It is thus seen that as the spindle is rotated either to the right or to the left the curtain 25 is drawn downwardly to the position shown in dotted lines in which position it is arranged behind the word "Turn" and affords the proper contrast to clearly delineate the word. The automatic means provided for rotating the spindle will be hereinafter fully described.

The means for moving the curtain 26 to position behind the word "Stop" comprises a flexible connecting element such as a steel wire 37 which is secured to the lower portion of the plate and then extends through the casing and through a suitable conduit 38 to a swinging lever 39. The swinging lever 39 is connected by means of a steel wire 40 with the brake lever B of the vehicle. It is thus obvious that when the brake lever is actuated to stop the car the curtain 26 is operated so as to afford a contrasting background for and thereby delineate the word "Stop" of the signal and advise the operators of succeeding vehicles of the intended change.

A semaphore 41 preferably in the form of an arrow is fixed to the spindle adjacent its outer end, and serves to indicate the intended change of direction of the car by means of the direction in which it points. It, for instance, indicates an intended change in a direction to the right when swung to the position shown in dotted lines in Figure 2. When in normal position it partially covers the word "Turn" and aids in rendering the same non-signalling or inoperative. The semaphore thus co-operates with the upper signal indicia, to wit: the word "Turn," to advise the operator of the succeeding vehicle of the precise change of direction contemplated.

Insulated stops L are carried by the plate 22 as shown in Figure 4, and limit the movement of the semaphore to right or left signalling position.

Automatic means is provided for rotating the spindle 27 to render active or signalling the semaphore and the indicia "Turn." This means is under the control of the steering mechanism S of the vehicle. For this purpose the steering post s of the steering mechanism is provided with a double reel 42 which consists of two sections 43, as shown in Figures 6 and 7, which are bolted together, as at 44, and thus clamped upon the steering post. A spool 45ᶜ is carried by the rotatable spindle and preferably is formed integral therewith. The spool 45ᶜ and the double reel 43 are connected by two flexible connecting elements 45 and 46 which have their ends oppositely wound upon the double reel and the spool. The connecting elements 45 and 46 are of composite construction consisting in the main of steel wire but having the ends which encircle the double reel formed of tapes, as indicated at 45ᵃ and 46ᵃ while the ends which encircle the double spool consist of extensible coil springs 45ᵇ and 46ᵇ. The extensible coil springs 45ᵇ and 46ᵇ take up the excess motion of the steering post as it is only necessary that sufficient motion be transmitted from the steering post to the rotating spool to move the spindle through a one-fourth revolution.

A tail light 47 is carried by the end of the spindle 27, a suitable socket being formed in the spindle to receive the same. A lens 48 of red glass is carried by a bracket 49 arranged upon the spindle to complete the tail light.

An incandescent lamp 50 is carried by the head of the arrow constituting the semaphore and is adapted to be energized only when the semaphore is in signalling position and when the tail light is energized.

Means is provided for energizing and controlling the tail light as desired and for automatically energizing and controlling the semaphore light when the tail light is in operation. This means includes a source of current, such as a battery 51, one terminal of which is grounded, as at 52, and the other terminal of which leads by a conductor 53 to the tail light 54. The tail light 54 is grounded, as at 55, preferably through the spindle and metallic casing. The conductor 53 extends in part through the rotating spindle 27 but is insulated therefrom. For this purpose its sections are provided with an electrical coupling element 53ᵃ, as shown in Figure 3, which is spring pressed and permits the sections of the conductor to partake of relative rotary motion without impairing the electrical properties of the conductor. One of the sections of the conductor 53 embodies a switch 56. It is obvious that when the switch 56 is closed the current flows from the battery through the switch 56, the sections of the conductor 53, the coupling element 53ª, the tail light 54 and then through the ground 55 back to the battery.

The incandescent lamp of the semaphore is, when the switch 56 is closed, always adapted to be energized whenever the semaphore is moved from non-signalling position to signalling position, either to the right or to the left. For this purpose, one of the sections of the conductor 53 is connected by a conductor 57 with the radial contact finger 58 which is carried by and insulated from the rotating spindle 53. The outer end of the contact finger 58 bears against an arcuate contact strip 59 carried upon the fiber plate so as to be insulated thereby. The opposite ends of the contact strip are connected by conductors 60 with contact segments 61 and 62 disposed respectively on the right and left hand side of the rotating spindle. A second contact finger 63 is carried by and insulated from the rotary spindle and is adapted to engage with either of the contact segments 61 and 62 accordingly as the vehicle is turned to the right or to the left. The second contact finger 63 is connected by a conductor 64 with the incandescent lamp 50 carried by the semaphore. The conductor 64 is insulated from the semaphore and the other terminal of the lamp is grounded through the semaphore, as indicated at 55. When the vehicle is turned the rotating spindle which is under the control of the steering mechanism thereof is also turned and carries with it the contact fingers 58 and 63 accordingly as the vehicle is turned to the right or left the contact finger 63 engages with the contact segments 61 or 62 while the contact finger 58 at all times engages with some portion of the contact strip 59. It is obvious that when the contact finger 63 is engaged with either of the contact segments 61 or 62 the current flows from the battery 51 through the conductor 53, conductor 57, contact finger 58, contact strip 59, conductor 60, contact segment 61 or 62 as the case may be, second contact finger 63, conductor 64, semaphore lamp 50 and ground 55 back to the battery. The contact fingers, contact strip and contact segments thus constitute a circuit controller for the extensible elements of the semaphore.

In operation it will be seen that as the driver of the automobile turns the steering wheel, the rotary spindle is turned and throws the semaphore in a corresponding direction. The steering mechanism also lowers the curtain 25 to alinement with the signalling indicia "Turn" and thus afford the contrasting background for the same to render it active or signalling.

If it is desired to illuminate the semaphore and to utilize the tail light as it is at night it is only necessary to close the switch 56. The tail light is then constantly illuminated and the semaphore lamp will automatically light as frequently as changes in the direction of motion of the vehicle is made.

When the vehicle is stopped it is always necessary for the operator to depress the brake pedal and when he does it the lower curtain is pulled down to behind the indicia "Stop" thus affording the desired contrast to render this indicia signalling.

At night the word "Stop" as well as the word "Turn" and the entire sign area is illuminated in the main from the tail lamp, the lateral rays from which afford this illumination as they also afford the illumination for the license plate by virtue of their projection through the openings 15 of the casing. This illumination is supplemented by the incandescent lamp of the semaphore when the vehicle is turned in any direction.

I claim:

1. In a vehicle signal of the character described, in combination with a vehicle having steering mechanism and brake mechanism, a signalling plate having a plurality of signalling indicia thereon, a background for said plate adapted to normally camouflage the signalling indicia thereof, a movable curtain for each signalling indicia having a contrasting background adapted to sharply delineate the indicia when disposed behind the same, a semaphore coacting with one of said signalling indicia, means controlled by the steering mechanism of the vehicle for moving one of said curtains to behind its signalling indicia and for throwing the coacting semaphore to signalling position, and means controlled by the brake mechanism for moving the other of said curtains to behind its signalling indicia.

2. In a vehicle signal of the character described, in combination with a vehicle having steering mechanism and brake mechanism, a signalling plate having a plurality of signalling indicia thereon, a background for said plate adapted to normally camouflage the signalling indicia thereof, a moving curtain for each signalling indicia having a contrasting background for the signalling indicia adapted to sharply delineate the indicia when disposed behind the same as a background, means controlled by the steering mechanism of the vehicle for moving one of said curtains to behind its signalling indicia, and means controlled by the brake mechanism of the vehicle for moving the other of said curtains to behind its signalling indicia.

3. In a vehicle signal of the character described, a signalling plate having signalling indicia provided thereon, a background for said plate adapted to normally camouflage the signalling indicia, a movable curtain having a contrasting background adapted to sharply delineate the signalling indicia when disposed behind the same as a background, and means controlled by the steering mechanism of the vehicle for moving said curtain to behind the indicia.

4. In a vehicle signal of the character described a signalling plate having signalling indicia provided thereon, a background for said plate adapted to normally camouflage the signalling indicia, a movable curtain having a contrasting background for a signalling indicia and adapted to sharply delineate the indicia when disposed behind the same as a background.

5. In a vehicle signal of the character described, signalling indicia, a background adapted to normally camouflage the indicia, and a curtain having a contrasting background for the signalling indicia adapted to sharply delineate the same when disposed therebehind, said curtain and said signalling indicia being relatively movable.

6. In a vehicle signal of the character described, in combination with a vehicle having steering mechanism and brake mechanism, a casing, a spindle rotatably mounted in said casing, a semaphore carried by said spindle, and means controlled by the steering mechanism for rotating said spindle including a double reel carried by the steering post of the steering mechanism, a spool carried by the rotatable spindle, and connecting elements having their ends oppositely wound upon the spool and upon the double reel respectively.

7. In a vehicle signal of the character described, the combination with a vehicle having brake mechanism, a signal plate having signalling indicia thereon, a background for said plate adapted to normally camouflage the signalling indicia, a movable curtain having a contrasting background adapted to sharply delineate the indicia when disposed behind the same, and means controlled by the brake mechanism of the vehicle for moving said curtain to behind its indicia.

GEORGE FREDERICK MESSER.